Dec. 8, 1964   J. MAURICE   3,160,253
DIAPHRAGM CLUTCH WITH DE-CLUTCHING RING
Filed July 24, 1961   5 Sheets-Sheet 2

INVENTOR
JEAN MAURICE
By Irwin S. Thompson
ATTY.

Dec. 8, 1964   J. MAURICE   3,160,253
DIAPHRAGM CLUTCH WITH DE-CLUTCHING RING
Filed July 24, 1961   5 Sheets-Sheet 3
FIG: 6
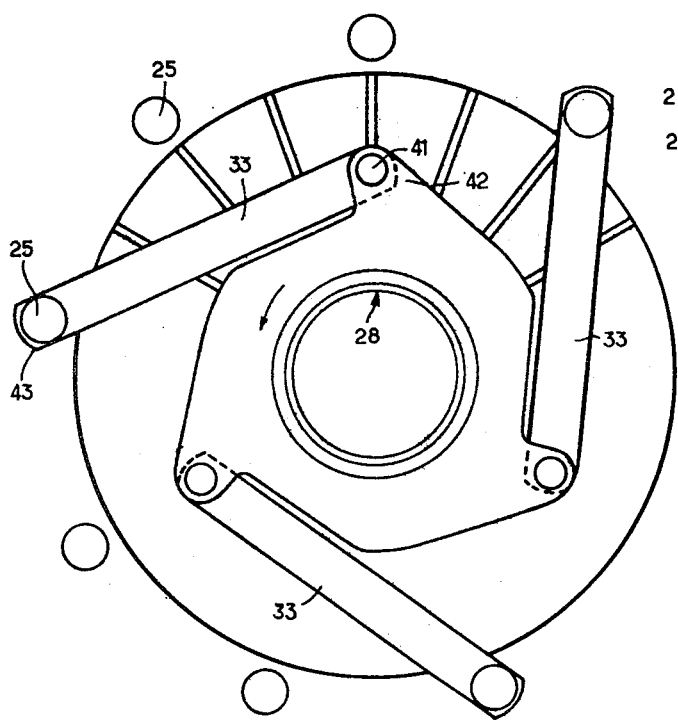
FIG: 7
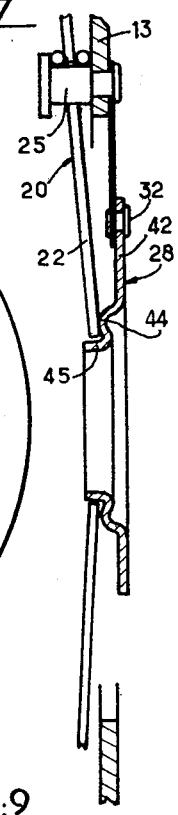
FIG: 8
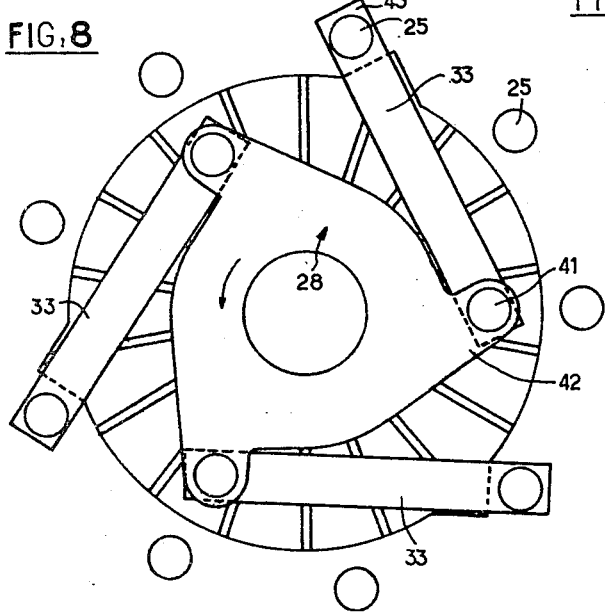
FIG: 9
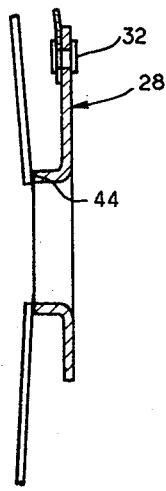
INVENTOR
JEAN MAURICE
By Irwin L. Thompson
Atty.

Dec. 8, 1964 J. MAURICE 3,160,253
DIAPHRAGM CLUTCH WITH DE-CLUTCHING RING
Filed July 24, 1961 5 Sheets-Sheet 4
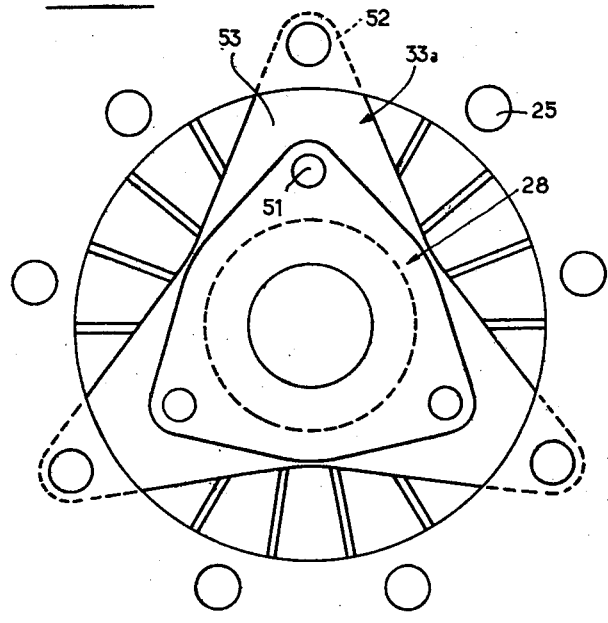
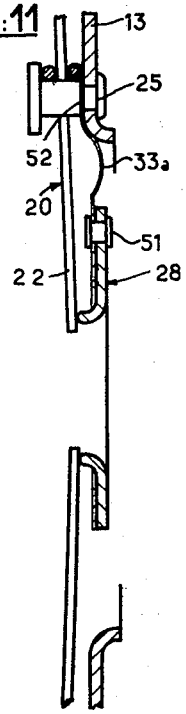
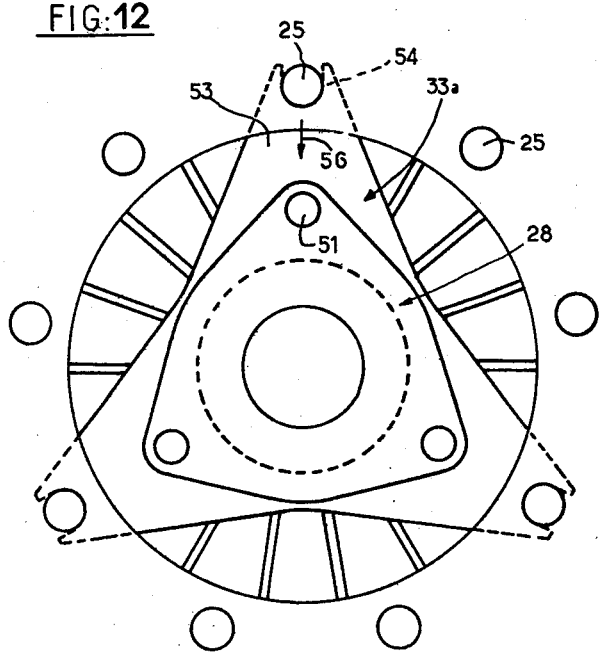
INVENTOR
JEAN MAURICE
BY Irwin S. Thompson
ATTY.

Dec. 8, 1964     J. MAURICE     3,160,253
DIAPHRAGM CLUTCH WITH DE-CLUTCHING RING
Filed July 24, 1961     5 Sheets-Sheet 5

INVENTOR
JEAN MAURICE
By Irwin S. Thompson
ATTY.

United States Patent Office 3,160,253
Patented Dec. 8, 1964

3,160,253
DIAPHRAGM CLUTCH WITH DE-CLUTCHING RING
Jean Maurice, Paris, France, assignor to Societe Anonyme Francaise du Ferodo, Paris, France, a corporation of France
Filed July 24, 1961, Ser. No. 126,062
Claims priority, application France Aug. 2, 1960
2 Claims. (Cl. 192—89)

The present invention relates to clutches of the type comprising a driven friction disc, a driving assemly having a pair of plates for gripping the said disc, a first member forming a cover, a second member forming an elastic diaphragm for clamping the disc between the plates, this second member being constituted at its periphery by a Belleville washer and having orifices in its central portion which form between each other de-clutching levers, and a de-clutching ring intended to push the said levers in order to release the disc.

The practical construction of clutches of this type presents difficulties as regards the driving of the de-clutching ring in ortation under good conditions.

The present invention has for its object a clutch of the type indicated above, which is free from these disadvantages and which is characterized in that the de-clutching ring is coupled to one of the said first and second members referred to above by coupling means which comprise at least one flexible and preferably elastic element and which are attached both to the ring and to the said member. In one form of construction, this member is the first member forming the cover, whereas in an alternative construction it is the second member which forms an elastic diaphragm.

In accordance with the invention, the coupling means comprise a set of at least three tangential tongues, or alternatively a small plate in the form of a star having at least three flexible radial feet for the attachment of this diaphragm to the said member.

In accordance with a further characteristic feature of the invention, the de-clutching ring is in two separate parts assembled together, one of a soft material adapted to co-operate in rotation with a clutch release stop with the minimum friction torque, the other of a harder material able ot resist hammering at its points of contact with the said levers.

Forms of construction of the invention are described below by way of example, reference being made to the accompanying drawings, in which.

FIGS. 6 and 7, 8 and 9, 10 and 11, 12 and 13, and 14 and 15 represent respectively views in elevation, each accompanied by an axial cross-section of other alternative forms of the ring and of its coupling means.

Figure 1:
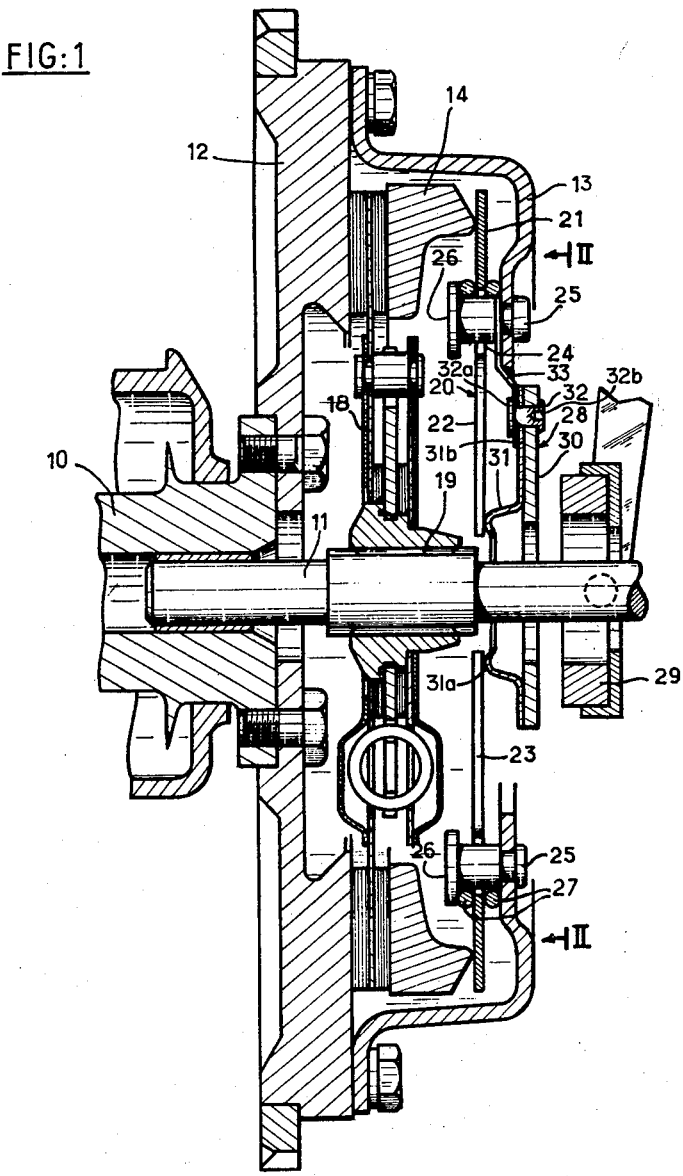
FIG. 1 is a view in longitudinal cross-section of a clutch in accordance with the invention.
Figure 2:
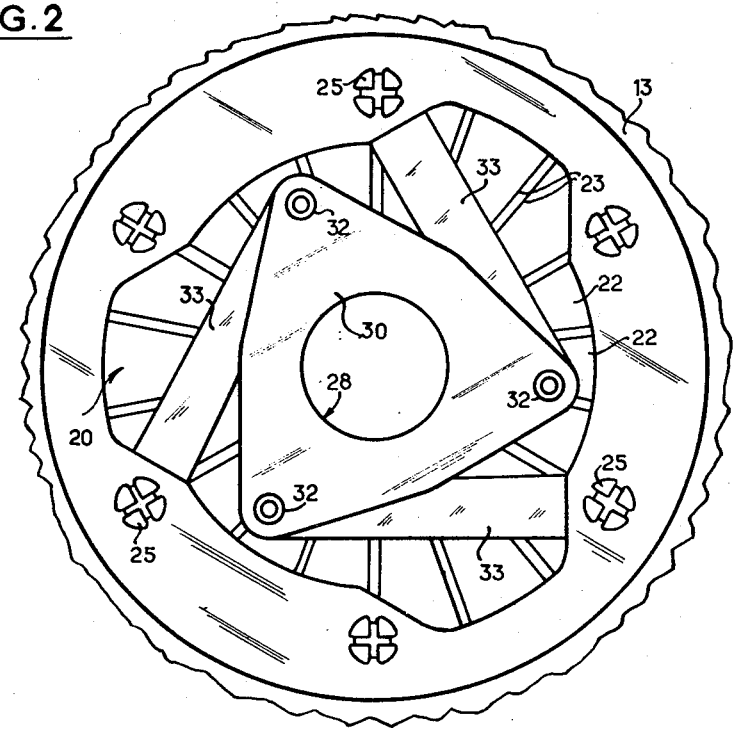
FIG. 2 is a view in elevation of the de-clutching ring and its coupling means, taken in the direction of the arrows II—II of FIG. 1.

Reference will first be made to FIGS. 1 and 2, in which a diaphragm clutch according to the invention comprises: a driving shaft 10, a driven shaft 11, a fly-wheel plate 12 rigidly fixed to the driving shaft 10, a cover element 13 fast with the fly-wheel plate 12, a pressure-plate 14 fixed for rotation with the assembly 12–13 by any appropriate means (not shown), such as tangential connecting tongues, or tenons and mortices or the like, and a friction disc 18 which is intended to be gripped between the plates 12 and 14 and which is fixed by splines 19 on the driven shaft 11.

The clutch engagement and disengagement control is of the diaphragm type, that is to say it comprises a washer or elastic diaphragm element 20 which has at its periphery a continuous ring 21 which acts in the same way as a Belleville washer, while its central portion is shaped to form radial levers 22 which are separated by gaps 23. The latter are narrow, thin slots widening out into larger circular or elongated orifices 24 in the adjacent portion of the continuous peripheral washer 21.

The diaphragm 20 is rockably mounted on the cover 13 by engagement of certain of the holes 24 on small pillars 25, the latter being fixed on the cover 13 and having flanged portions 26. It will be appreciated that the rivets 25 are arranged in a hollow boss of the cover 13, which enables the units formed by the parts 14, 21, 13 and 28 to be conveniently stacked together. Keeper-rings 27 position the washer 21 between the cover 13 and the flange 26. By this mounting, and on condition that no action is applied to the levers 22, the washer 21 applies an elastic action which pushes the plate 14 towards the fly-wheel 12, thus clamping the disc 18.

For de-clutching, provision is made for the application of an axial force on the inner extremities of the levers 22, and for that purpose, a de-clutching ring 28 suitably connected to the rotating driving assembly 12–13–21 as will be described below, is applied on the levers 22 and is intended to be pushed by a de-clutching stop or reciprocable actuating thrust ring means 29 which is movable axially but which cannot rotate. When the de-clutching is effected, the thrust of the ring 29 is transferred to the levers 22 through the intermediary of the ring 28 and causes the washer 21 to rock, thus removing its clamping action on the plate 14.

The ring 28 is provided in two parts or pieces: one of these parts 30 of soft material is a rear piece and is adapted to co-operate in rotation with the thrust ring 29 with the minimum of friction torque; the other part 31 is a front piece and is of harder material, capable of resisting the hammering effect on the levers 22. The two parts 30 and 31 are fixed together by rivets 32. In the example shown, these rivets 32 also serve as points of attachment to pre-stressed tangential and elastic tongues 33 (FIGS. 1 and 2), the other extremities of which are fixed to the cover 13 by certain of the small pillars 25. The tongues 33 form an elastic tongue connecting device. The ring 28 is thus suspended on the cover 13 by the tongues 33. The pre-stress of these tongues 33 hold the ring 28 applied against the levers 22. The front piece 31 has a front annular projection $31_a$ contacting the diaphragm element 20 and a rear flat portion $31_b$ directly contacting the tongues 33. The rivets 32 secure the tongues 33 to the flat portion $31_b$. Each rivet 32 has a pre-formed head $32_a$ applied against a tongue 33 and a post-formed head $32_b$ applied against the rear piece 30.

Figure 3:
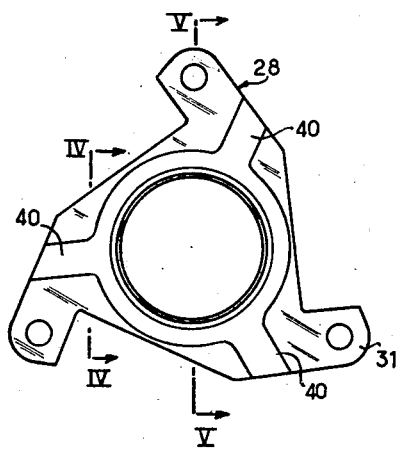
FIG. 3 is a view of an alternative form of ring.
Figure 4:
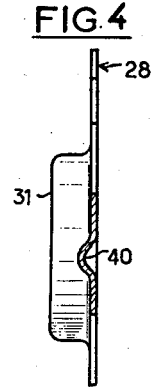
FIGS. 4 and 5 are views of this alternative in cross-section taken along the lines of the arrows IV—IV and V—V respectively.
Figure 5:
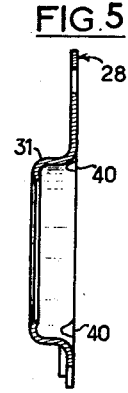

Reference will now be made to FIGS. 3 to 5 in which the arrangement is similar to that which has just been described with reference to FIGS. 1 and 2, but in which the portion in hard material 31 of the ring 28 is provided with punched channels 40, in radial directions, three in the example shown, which define ventilation passages for cooling purposes.

In the alternative form of FIGS. 6 and 7, the de-clutching ring 28 is in one single piece. It is centered and driven in rotation by the three tangential tongues 33, fixed at their rear extremities 41 to radial feet 42 of the ring. The front extremities 43 of these tongues are fixed to the cover 13, for example by means of rivets 25, as previously described. The extremities of the levers 22 may be supported axially on an annular bearing surface 44. The tongues 33 again serve in this case as members for coupling in rotation and centering members for the ring, and when so required as devices for taking-up axial play.

There may be provided on the ring 28 a cylindrical appendage 45 which engages with axial play in the central orifice of the washer without normally making any contact with the levers 22. It will be noted that this appendage only serves as a safety centering device in case of damage of one of the tongues 33, and may furthermore be dispensed with, as shown in FIGS. 8 and 9, which illustrate a similar form of embodiment.

FIGS. 10 and 11, and 12 and 13 illustrate respectively two other forms of embodiment in which the driving of the ring in rotation is effected, not by tangential tongues, but by small elastic plate of triangular star shape, which constiutes in a way a set of three radial tongues together in a single piece. In accordance with FIGS. 10 and 11, the central portion of this star 33a is rigidly fixed by rivets 51 to the ring 28, whereas the extremities 52 of its feet 53 are fixed to the cover 13 by means of the rivets 25. The feet 53 have a goffered or corrugated profile, as can be seen at 33a from FIG. 11, so as to permit axial displacement of the central portion of the star with the ring.

The star can be given an elasticity such that it continuously applies the ring 28 against the levers 22 of the washer 20, which takes up the axial play.

Figure 13:
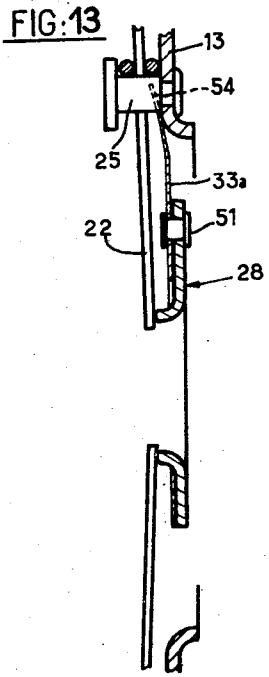

In the form of embodiment shown in FIGS. 12 and 13, the central portion of the star 33a is again rigidly fixed to the rings by rivets 51, while the extremity 54 of each foot 53 is shaped as a fork freely engaged on a rivet 25. This arrangement permits radial displacement of the feet 53 in the direction of the arrow 56, that is to say an axial displacement of the central portion of the star with the ring 28, without it being necessary to give the feet 53 the goffered profile of FIG. 11.

In the forms of embodiment previously described, the ring 28 is coupled by connecting means 33 or 33a to the cover 13, which has the advantage of avoiding all risk of shearing of the pivots 25. In the alternative form of FIGS. 13 and 14, the ring 28 is coupled to the washer or diaphragm 20 by similar coupling means, which has the advantage of permitting small displacements between the thrust ring 29 and its point of support on the diaphragm 20.

Figure 14:
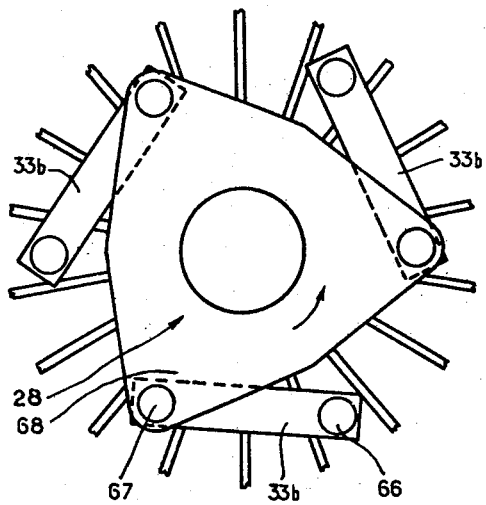
Figure 15:
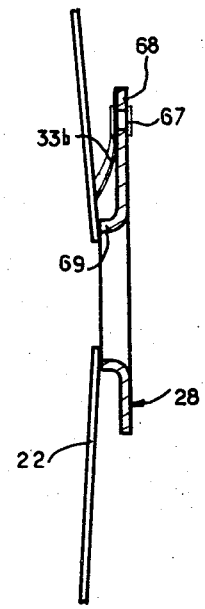

More particularly, in FIGS. 14 and 15, the de-clutching ring 28 is driven in rotation and correctly centered by three flexible tongues 33b tangentially arranged and each fixed by rivets at their front extremities to a point 66 of a lever 22 of the washer 20, and at their rear extremities 67 to a foot 68 which radially extends the ring 28.

The tangential tongues 33b can also act as springs so as to apply continuously the levers 22 against an annular bearing surface 69 of the ring 28. The arrangement of FIGS. 14 and 15 can thus ensure, at the same time as the rotational drive of the ring 28 and a correct centering of this ring, the axial coupling without play of the ring 28 to the ring 20.

What we claim is:

1. A clutch comprising a friction disc, a pair of plates operable to grip said friction disc, an elastic diaphragm element operable to urge said plates to clamp said friction disc between said plates, a cover element on which said elastic diaphragm element is rockably mounted, a de-clutching ring for pushing said elastic diaphragm element to rock said elastic diaphragm element to release said friction disc, an elastic tongue device connecting said ring with one of said elements, reciprocable actuating thrust ring means cooperating with said declutching ring, said declutching ring comprising a rear piece of soft material and a front piece of harder material, said rear piece frictionally cooperating with said reciprocable actuating thrust ring means, said front piece having a front annular projection contacting said elastic diaphragm element and a radially outward flange directly contacting said elastic tongue device, and rivet means for securing said tongue device to said flange.

2. A clutch as claimed in claim 1, wherein said two pieces are assembled together by said rivet means.

References Cited in the file of this patent

UNITED STATES PATENTS

| | | |
|---|---|---|
| 1,742,804 | Carhart | Jan. 7, 1930 |
| 2,234,755 | Geyer | Mar. 11, 1941 |
| 2,256,708 | Geyer et al. | Sept. 23, 1941 |
| 2,885,047 | Kehrl | May 5, 1959 |

FOREIGN PATENTS

| | | |
|---|---|---|
| 707,355 | Great Britain | Apr. 14, 1954 |
| 830,428 | Great Britain | Mar. 16, 1960 |